G. WATT.
Harrows.
No. 140,563.                                    Patented July 1, 1873.
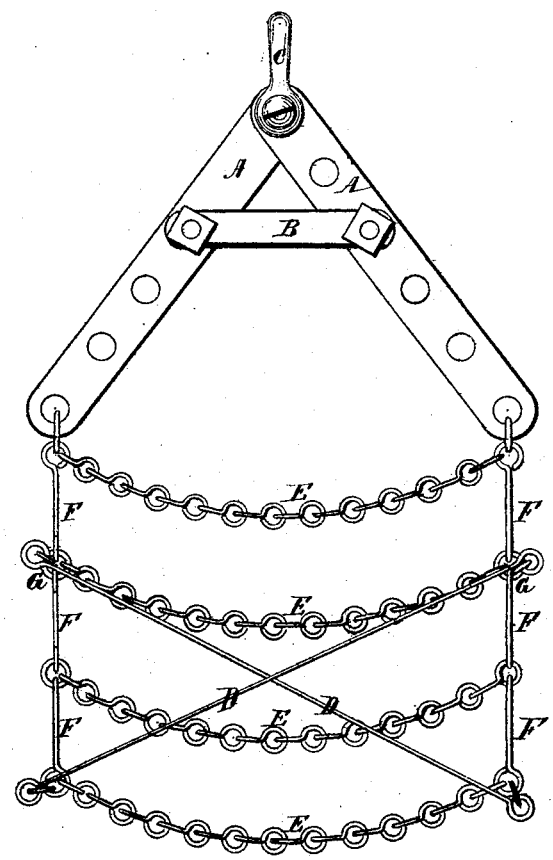

UNITED STATES PATENT OFFICE.

GEORGE WATT, OF RICHMOND, VIRGINIA.

IMPROVEMENT IN HARROWS.

Specification forming part of Letters Patent No. 140,563, dated July 1, 1873; application filed May 16, 1873.

*To all whom it may concern:*

Be it known that I, GEORGE WATT, of Richmond, in the county of Henrico and State of Virginia, have invented a new and Improved Chain-Harrow; and I do hereby declare the following to be a full, clear, and exact description of the same, reference being had to the accompanying drawing forming part of this specification, in which—

The figure represents a plan view of my improved harrow.

In the drawing, A A are two bars of iron, riveted at the top or clevis C by a bolt or rivet, so as to allow them to be expanded or contracted by moving the stay or brace B up or down to the different holes in said bars A. In these holes is put a bolt with a nut or tap on one end, which is screwed up tight, and holds the iron frame firmly together. D D are two iron brace-rods that cross each other and connect at their upper ends directly with the two bars A, or indirectly by an intermediate loop-link, and at their lower ends to the extreme outer ends of the rear and bottom chain. They serve to keep the harrow in proper form, and prevent it from bagging toward the rear. The four chains E are designed to cut through the irregular lumps, and to level and pulverize the broken surface of the earth preparatory to planting a crop, and after the crop is planted to cultivate the surface. F is a series of loop-links or short chains connecting with the four chains E, cross-rods D, and bars A in such a manner that while the harrow is kept nearly square the chains are kept equidistant from each other, and the whole drag allowed to adapt itself to all the inequalities of the surface, cutting off the lumps and filling up the sinks, while the surface is made smooth and thoroughly pulverized the grass is thus effectually killed.

A harrow thus constructed combines great strength and durability, and is suited to the garden or the field as a cultivator and harrow.

The brace-rods D D may be fastened to the rings or links of the chain by means of lap-rings, or bolts with nuts to them, and may be moved at their upper ends G G up or down to expand or contract, the lap-ring being used to connect said brace-rods to the different rings, which connect the chains E, the loop-links F, and the bars A A. The upper ends of rods D D may be connected directly to the holes in A A, or to the rings or links or rods, so as to expand or contract to any reasonable width between rows or beds.

Having thus described my invention, what I claim as new and desire to secure by Letters Patent, is—

A harrow, pulverizer, or cultivator composed of the spaced bars A A B and a series of chains, E, connected by loop-links F, and held in position by cross-bars D D, as described.

The above specification of my invention signed by me this 12th day of May, A. D. 1873.

GEO. WATT.

Witnesses:
MANFRED CALL,
R. A. WILLIAMS.